Jan. 16, 1934. G. M. BELLANCA 1,943,783
LANDING GEAR
Filed July 2, 1931
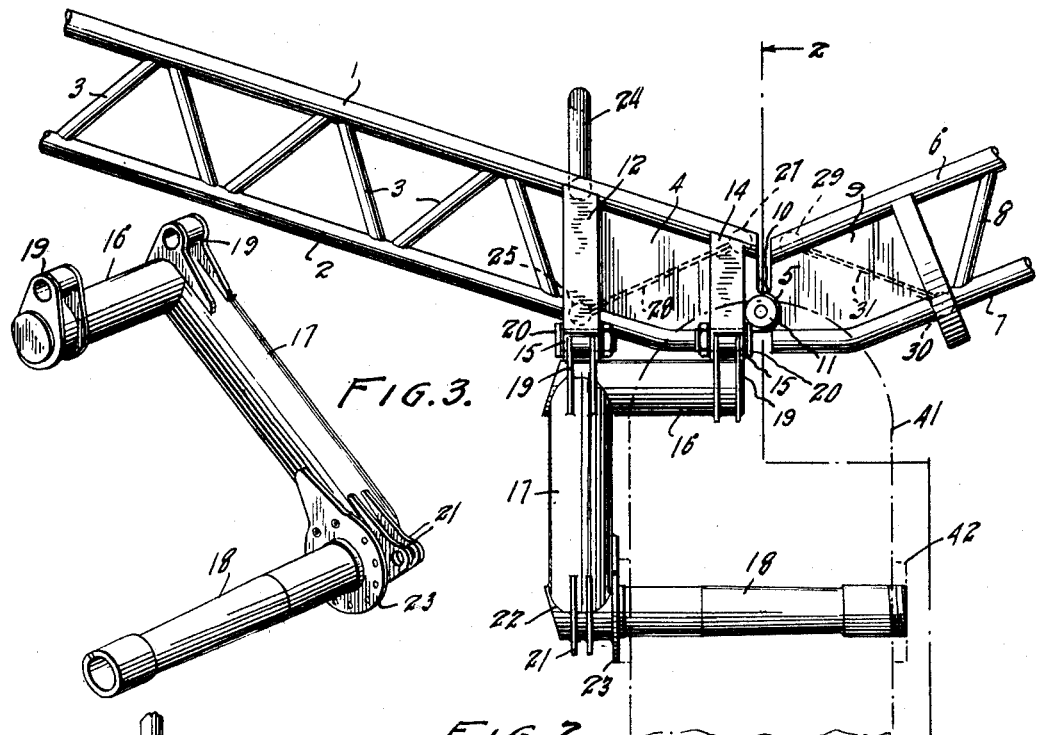
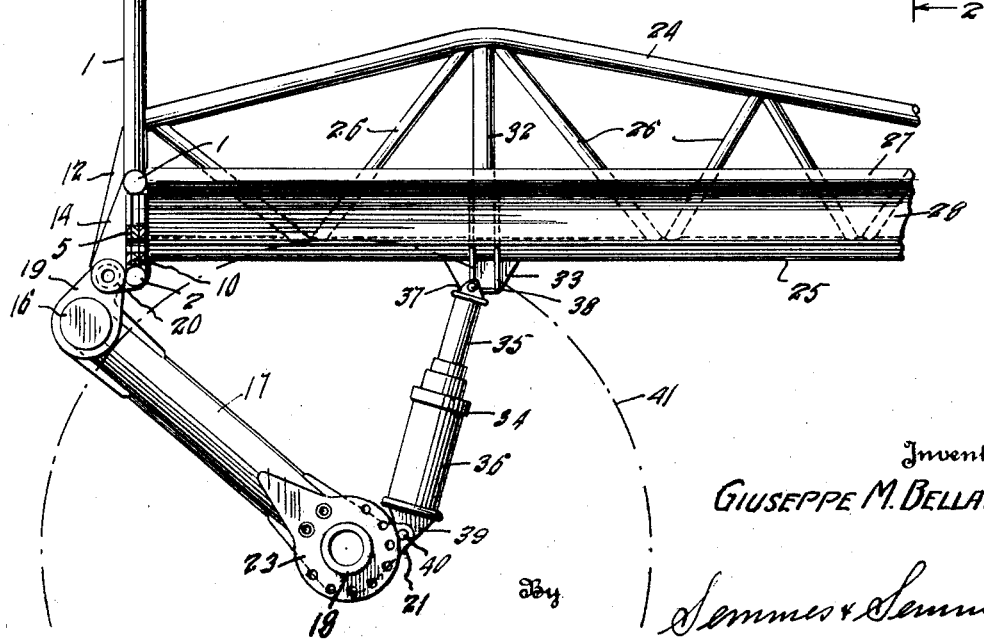
Inventor
GIUSEPPE M. BELLANCA
By Semmes & Semmes
Attorneys Patented Jan. 16, 1934

1,943,783

UNITED STATES PATENT OFFICE 1,943,783

LANDING GEAR

Giuseppe M. Bellanca, New Castle, Del.

Application July 2, 1931. Serial No. 548,438

11 Claims. (Cl. 244—2)

This invention relates to landing gears for airplanes.

An object of this invention is to provide a landing gear with easily removable wheels.

Another object of this invention is to provide a landing gear in which the landing gear frame is on one side of the wheels.

Still another object of this invention is to provide a landing gear having a stub axle for mounting the wheel.

A still further object of this invention is to provide a landing gear that is easily assembled and dismantled.

Yet another object of this invention is to provide a landing gear that is flexible so as to relieve the strain thereon upon the landing of an airplane.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

The landing gear provided by this invention broadly includes a leg pivotally secured to a strut wing of an airplane and carrying a stub axle, and an oleo shock absorber pivotally connected between the leg and a transverse support member positioned in the strut wing. A wheel is mounted on a stub axle and can be easily removed as all of the landing gear frame is positioned on only one side of the wheel.

In order to make my invention more clearly understood, I have shown, in the accompanying drawing, means for carrying the same into practical effect without limiting the improvements in their useful applications to the particular construction which, for the purpose of explanation, have been made the subject of illustration.

Figure 1 is a front elevation of a landing gear constructed in accordance with my invention.

Figure 2 is a sectional view taken along line 2—2 of Figure 1.

Figure 3 is a perspective view of the landing gear frame showing the stub axle carried thereby.

Referring to the figures of the drawing, wherein the same reference characters designate like parts throughout the several views and more particularly to Figure 1, there is shown a landing gear attached to an airplane structure. The front spar structure of the strut wing provides an attachement for the landing gear frame and comprises an upper rod 1 and a lower rod 2 suitably braced and joined by trusses 3. Positioned at the end of the strut wing and between the upper rod 1 and the lower rod 2 is a metallic plate 4. The metallic plate 4 serves as an additional brace between the upper and lower rods and also provides means for joining the strut wing to the stub wing. As illustrated, an integral projection 5 having an aperture therein is provided.

The stub wing likewise has a front spar which comprises an upper rod 6 and a lower rod 7 joined and braced by trusses 8. A metallic plate 9 is positioned at the end of the stub wing and between the upper and lower rods. The metallic plate 9 also has an apertured extension 10 adapted to cooperate with the apertured extension 5 for receiving a bolt 11, to join the strut wing and the stub wing. The connection between the strut and stub wings is somewhat pivotal to avoid sheering of the joint between the two wings by the strain set up in the landing gear of an airplane when coming in contact with the ground.

The rods and trusses of the strut and stub wings have been shown as solid metal rods, but it is understood that tubular rods may be used. Any metal or metal alloy may be employed for making the spars and rods, the requirements for the metal or metal alloy being light weight and high tensile strength. It is also within the scope of this invention to use wooden framework for both the strut and stub wings.

A support plate 12 is suitably joined to the upper rod 1 and lower rod 2. Another support plate 14 is joined to the same upper and lower rods near the termination of the strut wing. The support plates 12 and 14 may be welded to the upper and lower rods, although it is within the scope of this invention to secure the support plates by any suitable means, such as nuts and bolts. The support plates 12 and 14 are provided with channels 15 at their lower ends to receive a landing gear frame.

A landing gear frame constructed in accordance with my invention is pivotally connected to the strut wing. The frame of the landing gear comprises a mounting arm 16, a leg 17 at right angles thereto, and a stub axle 18 at right angles to the leg 17 and in the same direction of the mounting arm 16. As clearly illustrated in Figure 3, the mounting arm 16 is provided with integral mounting ears 19. The mount-ears 19 provide means for pivotally connecting the mounting arm 16 to the support plates 12 and 14 by means of bolts and nuts 20. The leg 17 is provided with integral apertured blade extensions 21, the purpose of which will hereinafter appear.

The mounting arm 16, leg 17 and integral extensions 19 and 21 may be formed of one piece of metal as shown in Figure 3. The stub axle 18 is shown as being hollow and welded to the leg 17 at its lower end 22. A backing plate 23 is secured to the leg 17 and is mounted on a collar of the stub axle 18. While the stub axle is shown as being hollow and welded to the leg 17, it is to be understood that it may be made solid and the entire landing gear frame cast or otherwise made as one piece.

Associated with the strut wing where the landing gear frame is attached thereto is a transverse support member extending the width of the strut wing. The transverse support member serves as spacing means between the front and rear supports of the strut wing and also provides a support for an associated part of the landing gear frame, to be hereinafter described.

The transverse support member comprises an upper tie rod 24 and a lower tie rod 25 joined together by trusses 26. A tie rod 27, similar to rod 26, is provided at the termination of the upper rod 1 and extends from the front spar and rear spar, not shown, of the strut wing. The tie rod 27 is joined to the tie rod 25 by means of a diagonally extending plate 28. The rods and plate may be welded to securely connect them together.

The stub wing is also provided with a suitable transversely extending bracing member. As shown in Figure 1, an upper tie rod 29 and a lower tie rod 30 are joined together by means of a diagonally extending plate 31. The rods 29 and 30 and the plate 31 also extend the width of the stub wing and are suitably connected to the rear upper and lower spars, which are not shown. The transversely extending rods and plate reinforce the wing at the point of greatest strain, that is, where the maximum strain is set up when the airplane landing gear comes in contact with the ground upon landing.

The rods extending transversely of the strut and stub wings and the associated trusses are shown as being solid. It is to be understood that hollow rods and trusses may be employed, the requirement for the metal or metal alloy employed being a high ratio of strength to weight.

A vertically extending truss 32 is positioned between the upper tie rod 24 and lower tie rod 25. The truss 32 serves to divide the strain upon landing evenly between the rod 25 and the rod 24. A plate 33 is secured to lower rod 25 of the transverse support member directly beneath the truss 32. The plate 33 may be secured to the supporting structure by any suitable means or, as shown, may be welded thereto.

A flexible link 34 is pivotally mounted between the plate 33 and the leg 17. The flexible link 34 comprises an upper member 35 adapted to be depressed within a lower member 36. The lower member 36 may be provided with an internal spring, or other suitable means for exerting an opposite pressure to the downward movement of the upper member 35. Hydraulic means may also be provided for the compressible unit. The flexible link 34 shown and described is of the oleo shock absorber type, although it is to be understood that other types may be employed without departing from the spirit of the invention.

The upper member 35 of the compressible unit is provided with an apertured mounting extension 37. The flexible unit 34 is pivotally connected to the plate 33 by means of a bolt 38 passing through the apertured extension 37 and an aperture in the plate. The lower member 36 is provided with a similar apertured extension 39 which fits into the blade extension 21 of the leg 17. A pivotal connection is made between the flexible link 34 and the leg 17 by passing a bolt 40 through the apertures.

Mounted on the stub axle 18 is an airplane landing gear wheel 41. The landing gear wheel 41 is secured on the stub axle by means of a nut 42. Suitable bearings may be provided between the hub of the wheel 41 and the stub axle 18 to reduce the friction therebetween.

While I have not shown fairing associated with the landing gear, it is to be understood that such wind reducing means may be provided. For instance, fairing may be provided to cover all of the landing gear frame structure and also the majority of the wheel. The fairing may be associated with the plates 28 and 31 and rods 27 and 29.

This invention has been described with reference to a landing gear structure only on one side of an airplane. Obviously a like structure is employed on the other side of the airplane.

From the foregoing, it is apparent that I have provided a flexible landing gear that takes up the strain upon the landing of an airplane. There is also provided by this invention a landing gear structure that permits of easy removal of the wheel without the complete dismantling of the entire structure.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. An airplane landing gear comprising a stub axle, a leg rigidly secured to one end of the stub axle and formed, at its other end, with a lateral extension substantially parallel to the stub axle, means spaced apart on said extension to pivotally connect it to the airplane, a compressible unit having one of its ends pivotally connected to said leg and the other end connected to the airplane and a wheel mounted on said stub axle.

2. An airplane landing gear comprising a stub axle, a leg rigidly secured at one end to the stub axle, means attached to the other end of the leg to pivotally secure it at spaced points to a structural part of the airplane, an oleo shock absorber having one of its ends pivotally connected to said leg and the other end connected to the airplane and a wheel mounted on said stub axle.

3. An airplane having a wing member and a landing gear, said landing gear comprising a stub axle carried by a leg, a lateral extension on the leg and formed with a plurality of bearing lugs, means to pivotally connect the lugs to the wing member of the airplane, a compressible unit having one of its ends pivotally connected to said leg and the other end connected to a transverse support member in said wing and a wheel carried by said stub axle.

4. An airplane having a wing member and a landing gear, said landing gear comprising a leg having a mounting arm for pivotally connecting same at a plurality of spaced points to the wing member of the airplane, a stub axle carried by said leg, and extending substantially parallel to the said arm, a compressible member pivotally connected at one end to said leg, and secured to a transverse support member of the said wing at the other end and a wheel mounted on said stub axle.

5. In combination with an airplane having a strut wing with a support plate secured thereto, a landing gear comprising a leg having a mounting arm adapted to pivotally connect said leg to said support plate, a stub axle carried by said leg, a compressible unit having one of its ends pivotally connected to said leg and the other end connected to a transverse support member and a wheel carried by said stub axle.

6. In combination with an airplane having a strut wing with a support plate secured thereto, a landing gear comprising a leg, a mounting arm secured to said leg for pivotally connecting same to said support plate, a stub axle carried by said leg, an oleo shock absorber pivotally connected at one end to said leg and secured at its other end to a transverse support member and a wheel carried by said stub axle.

7. A landing gear for an airplane having a strut wing with a support plate secured thereto, comprising a mounting arm provided with extensions for pivotally connecting same to said support plate, a leg secured to said mounting arm, said leg having blade extensions, a stub axle carried by said leg, a compressible unit having one end adapted to be pivotally connected to the blade extensions on the leg, the other end being secured to a transverse support member of the strut wing, and a wheel carried by said stub axle.

8. In combination with an airplane, a strut wing, a stub wing, means for connecting said wings, support plates connected to said strut wing, a transverse extending support member for said strut wing, a landing gear comprising a leg having a mounting arm connected to said support plates, a stub axle carried by said leg, an oleo shock absorber pivotally connected between said leg and the transverse support member and a wheel mounted on said stub axle.

9. In combination with an airplane, a strut wing, a stub wing, means for connecting said wings, support plates connected to said strut wing, a transverse extending support member for said strut wing, a landing gear comprising a leg having a mounting arm for pivotally connecting same to the support plates, a stub axle carried by said leg, a compressible unit pivotally connected between said leg and the transverse support member, a wheel mounted on said stub axle and means for maintaining said wheel on said axle.

10. A landing gear mounting comprising a stub axle, a leg member integrally formed with one end of the axle and extending substantially perpendicularly therefrom, a mounting arm integrally formed with the leg and extending substantially parallel to the axle, and a plurality of spaced bearing lugs formed on the arm.

11. In combination with an airplane having a lower wing surface, a landing gear attached to the wing surface comprising a stub axle for receiving the landing wheel, a leg member integrally formed on one end of the stub axle and extending perpendicularly therefrom, an integral lateral arm formed on the leg member and extending substantially parallel to and in the same direction as the stub axle and terminating at substantially the midpoint of the stub axle; bearing lugs formed adjacent the extremities of the arm and means to attach the bearing lugs to the said wing.

GIUSEPPE M. BELLANCA.